United States Patent
Hara et al.

(10) Patent No.: US 8,119,216 B2
(45) Date of Patent: Feb. 21, 2012

(54) OPTICAL INFORMATION RECORDING MEDIUM AND MANUFACTURING METHOD THEREOF

(75) Inventors: Fumi Hara, Takasaki (JP); Takeshi Otsu, Takasaki (JP); Isao Matsuda, Takasaki (JP); Shingo Katoh, Takasaki (JP); Masashi Satoh, Takasaki (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 565 days.

(21) Appl. No.: 12/333,269

(22) Filed: Dec. 11, 2008

(65) Prior Publication Data
US 2009/0154332 A1 Jun. 18, 2009

(30) Foreign Application Priority Data

Dec. 12, 2007 (JP) .................................. 2007-320584
Nov. 6, 2008 (JP) .................................. 2008-285956

(51) Int. Cl.
*B32B 3/02* (2006.01)
(52) U.S. Cl. .................. 428/64.1; 428/64.4; 430/270.11
(58) Field of Classification Search .................. 428/64.4
See application file for complete search history.

(56) References Cited

U.S. PATENT DOCUMENTS

| 5,082,690 A | 1/1992 | Miyake et al. |
| 5,989,669 A * | 11/1999 | Usami ..................... 428/64.1 |
| 6,787,211 B2 * | 9/2004 | Kishima ..................... 428/64.1 |
| 2007/0228375 A1 | 10/2007 | Tomekawa |

FOREIGN PATENT DOCUMENTS

| EP | 0398662 A | 11/1990 |
| EP | 1293975 A | 3/2003 |
| JP | H04-014634 A1 | 1/1992 |
| JP | H11-134714 A1 | 5/1999 |
| JP | 2005-267670 A1 | 9/2005 |

* cited by examiner

*Primary Examiner* — Elizabeth Mulvaney
(74) *Attorney, Agent, or Firm* — Law Office of Katsuhiro Arai

(57) ABSTRACT

An optical information recording medium has at least an optical reflective layer, an optical recording layer, a protective layer, and an optical transparency layer formed in that order on the main surface of a disc-shaped substrate. An area in which the protective layer is formed is made wider than an area in which the reflective layer is formed, and made narrower than an area in which the optical transparency layer is formed.

17 Claims, 3 Drawing Sheets

OPTICAL INFORMATION RECORDING MEDIUM AND MANUFACTURING METHOD THEREOF

BACKGROUND OF THE INVENTION

1. Field of the Invention

The present invention relates to an optical information recording medium and a manufacturing method thereof. More particularly, the present invention is concerned with an optical information recording medium having a protective layer, and an optical information recording medium manufacturing method based on a sputtering method.

2. Description of the Related Art

In recent years, high-definition video data has come to be recorded in optical information recording media. Accordingly, there is an increasing demand for an optical information recording medium offering a higher information recording density. A write-once type optical information recording medium that employs laser light of a short wavelength ranging from about 360 nm to about 450 nm (such as around 405 nm), for example, a Blu-ray disc has been proposed. The optical information recording medium has an organic dye compound such as an azo dye or a cyanine dye employed in an optical recording layer thereof. By absorbing laser light, the organic dye compound is decomposed or degenerated. A change in the optical characteristic of the organic dye compound occurring at the recording/playback wavelength of the laser light is measured as a degree of modulation, whereby recording or playback can be achieved.

The foregoing optical information recording medium has an optical reflective layer and an optical recording layer successively formed or superposed on a resin substrate which has a guide groove (which may be called a pre-groove, but it is abbreviated as "groove" hereinafter) formed in the light incidence side surface thereof. An optical transparency layer made of an optical transparency resin is formed on the optical recording layer. Thus, the optical information recording medium has the same diameter and thickness as a CD-R or a DVD±R does. For protection of the optical recording layer, a protective layer made of an optically transmissive inorganic material is interposed between the optical recording layer and optical transparency layer.

As for the Blu-ray disc having an organic dye coated as the optical recording layer, a fabricating procedure is such that the surface of a resin substrate in which grooves are formed is coated with an optical reflective film in a vacuum according to the sputtering method, is tentatively taken out to the air, is coated with an organic dye according to the spin coat method, is coated with a protective film in a vacuum again according to the sputtering method, and is finally bonded to an optically transmissive sheet. When the optical recording layer is made of an inorganic material, a method of carrying the optical reflective layer, optical recording layer, and protective layer in a vacuum and continuously sputtering them is adopted so that the layers can be accumulated without being taken out to the air.

Figure 5:
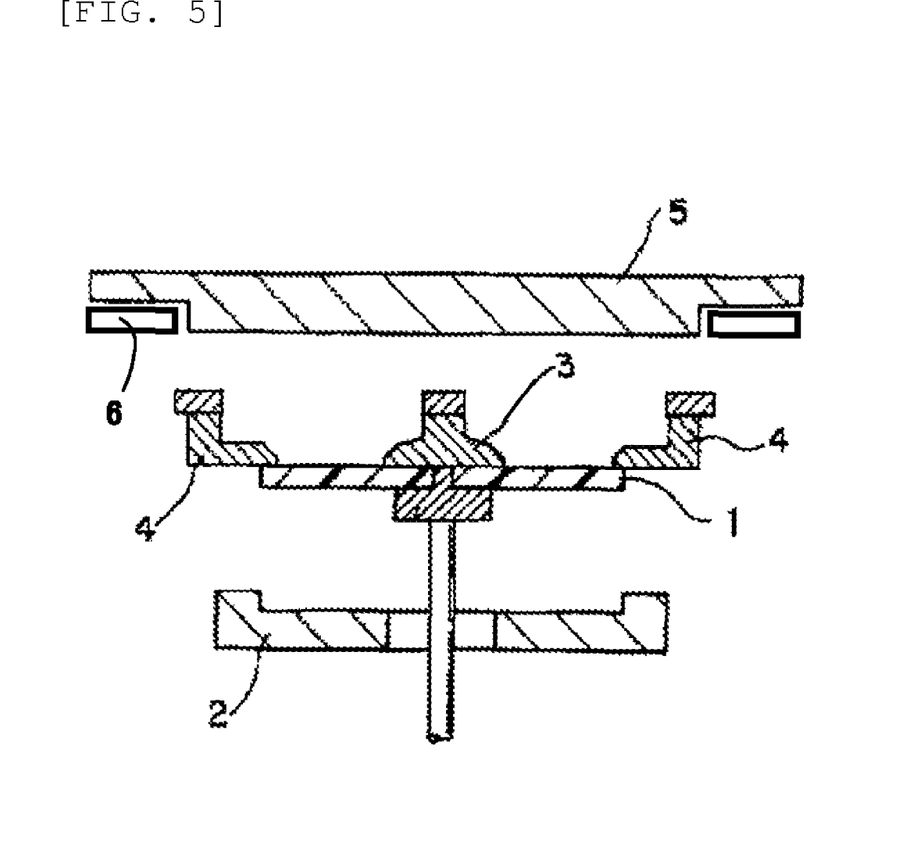
FIG. 5 illustratively shows an example of a sputtering device.

In a sputtering device to be employed in coating the optical reflective layer and others, a substrate holder 2 for an optical information recording medium and a target presser 6 are, as shown in FIG. 5, employed so that a substrate 1 of an information recording medium that is a workpiece will be opposed to a target 5 which is gold, aluminum, or the like. The substrate holder 2 and target presser 6 are made of a nonconductive resin material for fear when the high-frequency sputtering method is used for coating, the substrate to be sputtered or the target may conduct.

When the substrate 1 of the optical information recording medium is set in place, an inner mask 3 and an outer mask 4 are placed on the center of the substrate 1 and the perimeter thereof in order to mask the coating side of the substrate 1. As a mask material, a metallic material or an alloy material is generally adopted.

Figure 6:
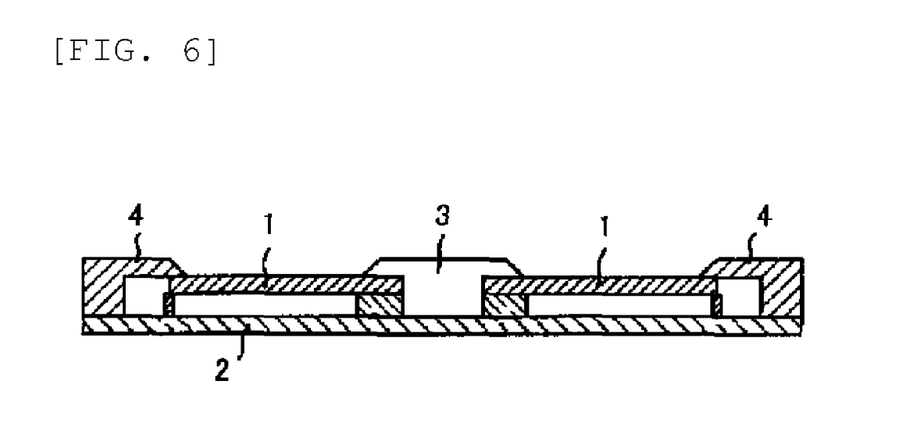
FIG. 6 illustratively shows another example of a substrate holder.

FIG. 6 shows another example of the substrate holder, wherein the similar inner mask 3 and outer mask 4 are employed.

Forming the protective layer after the optical reflective layer is coated over the substrate according to the sputtering method is not limited to the aforesaid Blu-ray disc but is performed on any other type of optical information recording medium.

For example, a patent document 1 reads that an optical reflective layer is formed on a playback-only disc, which has the optical reflective layer and a protective layer coated over a disc-shaped substrate made of a synthetic resin and having ruggedness information inscribed therein, according to the sputtering method, the inner marginal part of the substrate and the outer marginal part thereof are shielded with a cover.

A patent document 2 says that a reflective layer is deposited on a recording layer according to the sputtering method or the like in order to produce an optical information recording medium which has at least a recording dye layer made of a dye material, the reflective layer made of a metal, and a protective layer formed successively on a transparent substrate.

Further, a patent document 3 reads that for production of an optical information recording medium of two-layer type having a recording layer that contains an organic dye, an optical reflective layer and a protective layer containing elemental sulfur are not brought into contact with each other. The patent document 3 says that the protective layer is formed according to the sputtering method.

Incidentally, the patent document 1 refers to JP-A-4-14634, the patent document 2 refers to JP-A-11-134714, and the patent document 3 refers to JP-A-2005-267670.

In the optical information recording media described in the patent documents 1 and 2, the sputtering method is adopted only at the step of forming the optical reflective layer. Since the protective layer is formed by spinning an ultraviolet stiffening resin so as to apply it over the optical reflective layer, no problem occurs. However, for manufacture of the Blu-ray disc, after the optical reflective layer and an optical recording layer are coated, when a protective layer is coated by performing sputtering, if the inner mask and outer mask come into contact with the already formed metallic optical reflective layer, the optical reflective layer becomes conducting. Abnormal electrical discharge may take place. In this case, the outer circumferential end surface of the optical reflective layer may be jagged. Otherwise, a lightning-like electrical discharge mark that runs from the outer circumferential end of the optical reflective layer to the inner circumferential side thereof has occurred, or any other unprecedented problem has come to light.

In the optical information recording medium described in the patent document 3, various kinds of protective layers are exemplified. However, a concrete way of masking is not described. No description is made of the foregoing problems.

SUMMARY OF THE INVENTION

An object of an embodiment of the present invention is to solve one or more of the foregoing problems being confronted when a protective layer is coated according to the sputtering method in order to produce an optical information recording medium which has the protective layer as an upper layer of an optical reflective layer formed on a substrate, and to provide a faultless optical information recording medium and a manufacturing method thereof by preventing occurrence of abnormal electrical discharge.

The present inventor et al. have made profound studies in efforts to accomplish at least the above object, and have found that one or more of the aforesaid problems can be solved, for example, by making an area of a protective layer wider than an area, in which an optical reflective layer is formed, using a mask, which makes it possible to avoid contact with the already coated optical reflective layer, when forming the protective layer according to the sputtering method.

However, when the area of the protective layer is made wider than the area of the optical reflective layer, although occurrence of abnormal electrical discharge can be prevented, the protective layer comes into direct contact with a substrate. Since the protective layer made of an inorganic material does not fit with the substrate made of a resin, the protective layer is liable to peel off from the interface with the substrate.

The present inventor et al. have discussed the matter, and found that the issues of the abnormal electrical discharge and peeling can be settled by making the area, in which the protective layer is formed, wider than the area in which the optical reflective layer is formed, and forming an optical transparency layer so that the optical transparency layer will cover the protective layer and will have part thereof closely attached to part of a substrate.

The present invention has been completed based on one or more of the foregoing findings and include, but are not limited to, the following embodiments:

(1) In an optical information recording medium including at least a substrate, an optical reflective layer formed on a main surface of the substrate, an optical recording layer formed on the upper surface of the optical reflective layer, a protective layer formed on the upper surface of the optical recording layer, and an optical transparency layer formed on the upper surface of the protective layer: the protective layer is a layer formed according to the sputtering method; and an area in which the protective layer is formed is wider than an area in which the optical reflective layer is formed, and directly or indirectly covers the end of the optical reflective layer. The sputtering method can be conducted by any suitable methods including, but not limited to, any suitable conventional methods.

(2) In the optical information recording medium set forth in (1), the optical transparency layer covers the protective layer and continuously extends to the outer circumferential end of the substrate.

(3) In the optical information recording medium set forth in (1), the optical transparency layer continuously extends to overpass the outer circumferential end of the substrate so as to cover the margin of the outer circumferential end.

(4) In a manufacturing method of the optical information recording medium set forth in any of (1) to (3), the inner circumferential end of an outer mask to be used to form the protective layer according to the sputtering method is located circumferentially outside the position equivalent to the outer circumferential end of the area in which the optical reflective layer is formed.

(5) In the manufacturing method of the optical information recording medium set forth in any of (1) to (3), the outer circumferential end of an inner mask to be used to form the protective layer according to the sputtering method is located circumferentially inside the position equivalent to the inner circumferential end of the area in which the optical reflective layer is formed.

(6) In the manufacturing method of the optical information recording medium set forth in any of (1) to (3), the inner circumferential end of an outer mask to be used to form the protective layer according to the sputtering method is located at the position equivalent to the outer circumferential end of the area in which the optical reflective layer is formed, and the thickness of the mask near the inner circumferential end thereof continuously or stepwise increases along with a departure from the position equivalent to the outer circumferential end of the optical reflective layer.

In at least one of the disclosed embodiments of the present invention, when a protective layer is formed according to the sputtering method, an area of the protective layer is formed wider than an area of an already formed optical reflective layer. Thus, an inner mask and an outer mask can be prevented from coming into contact with the optical reflective layer. Eventually, occurrence of an abnormal electrical discharge can be avoided.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are oversimplified for illustrative purposes and are not necessarily to scale.

DESCRIPTION OF THE PREFERRED EMBODIMENTS

The present invention will be explained in detail with reference to preferred embodiments and drawings. However, the preferred embodiments and drawings are not intended to limit the present invention.

Figure 1:
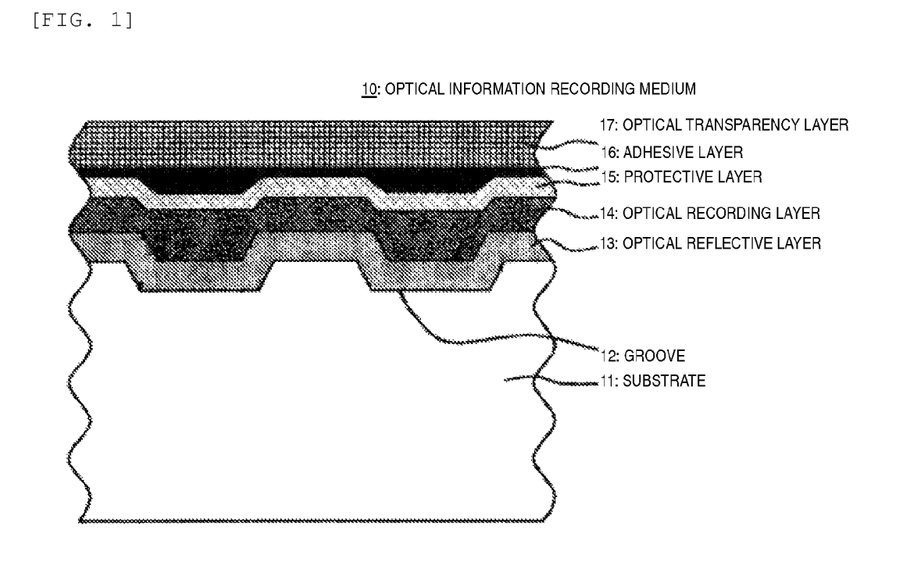
FIG. 1 is a partially enlarged sectional view showing the internal structure of an optical information recording medium in accordance with an embodiment of the present invention.

FIG. 1 shows an example of an optical information recording medium in accordance with an embodiment of the present invention. A spiral-shaped groove 12 is formed in a main surface of a disc-shaped substrate 11 having a thickness of approximately 1.1 mm. On the main surface of the substrate 11 in which the spiral-shaped groove 12 is formed, an optical reflective layer 13 that reflects laser light, an optical recording layer 14 containing a photoabsorption material, for example composed of an organic dye which absorbs the laser light, a protective layer 15 made of an inorganic material, an adhesive layer 16 formed if necessary, and an optical transparency layer 17 of approximately 0.1 mm thick are accumulated in that order.

In an embodiment of the present invention, the protective layer 15 is a layer formed according to the sputtering method. An area in which the protective layer is formed is so wide as to cover the flank of an area, in which the optical reflective layer 13 is formed, on the inner circumferential side thereof and the flank thereof on the outer circumferential side thereof. The optical transparency layer 17 is formed to be wider than the area, in which the protective layer 15 is formed, so as to cover the flank of the protective layer 15 on the inner circumferential side thereof and the flank thereof on the outer circumferential side thereof. Thus, the protective layer 15 is formed to be a bit narrower than the area of the optical transparency layer formed thereon. Preferably, the outer circumferential end of the optical transparency layer 17 is closely attached to the outer circumferential end surface of the substrate 11 or the margin of the outer circumferential flank thereof. Owing to the structure, the protective layer 15 can be prevented from peeling off from the interface with the substrate 11.

Even when the optical transparency layer 17 is of a sheet shape, since the outer circumferential end of the optical transparency layer 17 is bonded to the outer circumferential end of the substrate 11, nearly the same advantage as the foregoing one can be exerted.

Figure 2:
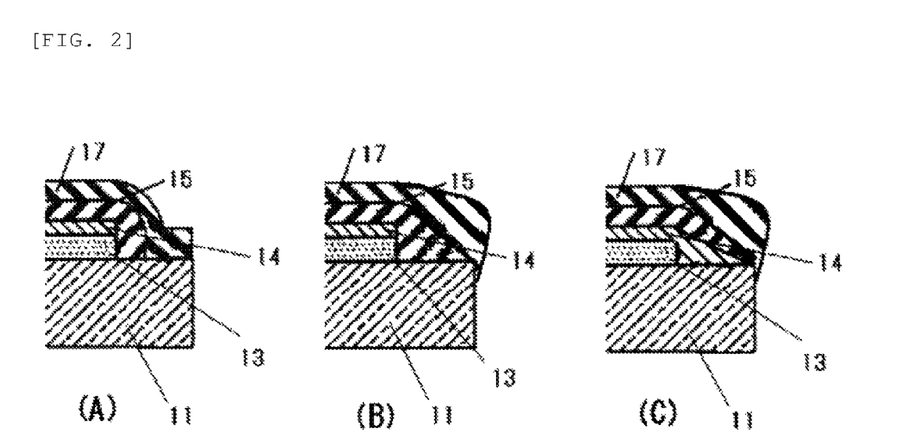
FIG. 2A to FIG. 2C illustratively show the outer circumferential margin of the optical information recording medium in accordance with an embodiment of the present invention.

FIG. 2A to FIG. 2C illustratively show the results of microscopic observation of the section of the outer circumferential end of the optical information recording medium 10.

In the optical information recording medium according to an embodiment of the present invention, as shown in FIG. 2A, the optical transparency layer 17 preferably continuously extends to the outer circumferential margin of the disc-shaped substrate 11 of the optical information recording medium 10. According to the optical information recording medium 10, the protective layer 15 covers the end surfaces of the optical reflective layer 13 and optical recording layer 14 respectively. The optical transparency layer 17 covers the protective layer 15. At the same time, since the optical transparency layer 17 continuously extends to the outer circumferential end of the substrate 11, electrical discharge occurring when the protective layer 15 is formed can be prevented. Further, peeling of the protective layer 15 can be effectively prevented. The optical transparency layer 17 in the present embodiment is formed with a sheet-shaped resin. Noted is that the adhesive layer 16 used to attach the optical transparency layer 17 to the upper surface of the protective layer 15 is not shown.

In the embodiment shown in FIG. 2B, the protective layer 15 covers the end surfaces of the optical reflective layer 13 and optical recording layer 14 respectively in the same manner as the one shown in FIG. 2A does. However, the protective layer 15 is different from the one shown in FIG. 2A in a point that the outer circumferential end of the protective layer 15 is formed to extend to the outer circumferential end of the substrate 11. Further, the optical transparency layer 17 is formed to extend to the margin of the outer circumferential flank of the substrate 11 so that the optical transparency layer 17 will overpass the outer circumferential end of the protective layer 15 and will jut out from the outer circumferential flank of the substrate 11.

Further, the embodiment shown in FIG. 2C is different from the aforesaid embodiments in a point that the optical recording layer 14 is formed to extend to the outer circumferential end of the substrate 11 so that the optical recording layer 14 will cover the end surface of the optical reflective layer 13. The protective layer 15 is formed to cover the upper surface of the optical recording layer 14. The optical transparency layer 17 is formed in the same manner as the one shown in FIG. 2B is. The position of the outer circumferential end of the optical recording layer 14 in this embodiment lies at the outer circumferential end of the substrate 11. A difference in the way of fabrication is controlled with the number of rotations and time to be specified for the spin coat method.

By adopting the constitution shown in FIG. 2B or FIG. 2C, even when the protective layer 15 is extended to the outer circumferential end of the substrate 11, peeling can be prevented. In addition, electrical discharge occurring when the protective layer 15 is formed through sputtering can be prevented. In any of the embodiments, the optical transparency layer 17 is formed by spin coating a liquid resin while adjusting the number of rotations and the time.

The optical information recording medium 11 in accordance with an embodiment of the present invention will be described below layer by layer.

(Substrate)

In an embodiment of the present invention, as the substrate 11, any of various materials adopted as conventional substrate materials can be selected and used. Specifically, an acrylic resin such as polycarbonate or polymethyl methacrylate, a vinyl chloride-series resin such as polyvinyl chloride or vinyl chloride copolymer, an epoxy resin, amorphous polyolefin, a polyester resin, a metal such as aluminum, and glass can be employed and may be combined if necessary. Among these materials, a thermoplastic resin is preferred in terms of moldaility, moisture resistivity, dimensional stability, and a low price. Polycarbonate is particularly preferred.

When any of the resins is adopted, the substrate 11 is formed to have a predetermined shape according to a method of injection molding or the like. For production of, for example, an optical disk, the substrate 11 is preferably formed annularly. The thickness of the substrate 11 preferably ranges from 0.9 mm to 1.1 mm. However, the present invention is not limited to the aforesaid materials. For example, an ultraviolet-cured resin may be adopted. The ultraviolet stiffening resin may be applied to the substrate, and the resultant film may be cured.

In an embodiment of the present invention, the spiral-shaped groove 12 is preferably formed concurrently during injection molding of the substrate 11. A template called a stamper and having a convex spiral-shaped pattern, which is the reverse of the groove 12, formed on the main surface thereof through micro-processing is placed in a metal mold employed in injection molding of the substrate 11.

(Optical Reflective Layer)

The optical reflective layer 13 in an embodiment of the present invention reflects laser light to be used for recording of data and/or playback thereof. In order to upgrade the reflectivity relative to laser light and improve the recording/playback characteristic, the optical reflective layer 13 is interposed between the substrate 11 and optical recording layer 14. The optical reflective layer is formed on the surface of the substrate 11, in which the groove 12 is formed, according to, for example, a deposition method, an ion plating method, or the sputtering method. The sputtering method is preferred in terms of mass productivity and a cost.

As a material to be made into the optical reflective layer 13, any material will do as long as the material is preferably adopted for the optical reflective layer of an ordinary optical disc. A metallic film made of Au, Al, Ag, Cu, or Pd, an alloy film made of an alloy of any of these metals, or an alloy film made of an alloy having a minor constituent appended to any of these metals is preferably employed.

(Optical Recording Layer)

Preferably, the optical recording layer 14 contains a photoabsorption material composed of an organic dye that absorbs laser light. An optical recording layer of a dye type in which pits are formed by laser beam irradiation in order to record data is preferred. As the organic dye, a phthalocyanine dye, a cyanine dye, an azo dye, or the like is preferred. For example, an azo dye expressed by a chemical formula 1 or a cyanine dye expressed by a chemical formula 2 is dissolved together with a binder into a solvent, for example, tetrafluoro propanol (TFP), whereby coating liquid is prepared. Thereafter, the coating liquid is applied via the optical reflective layer according to the spin coat method or screen-printing method in order to form a film. Thereafter, the film is preferably desiccated at the temperature of, for example, 80° C. for thirty min.

[Chemical 1]

(In the formula, A and A' denote heterocycles that are identical to or different from each other and that contain one or multiple heteroatoms to be selected from among a nitrogen atom, an oxygen atom, a sulfur atom, a selenium atom, and a tellurium atom. $R_{21}$ to $R_{24}$ each independently denote a hydrogen atom or a substitution radical. $Y_{21}$ and $Y_{22}$ denote heteroatoms that are identical to or different from each other and that are selected from among the elements included in the sixteenth group of the periodic table.)

[Chemical 2]

(In the formula, $\Phi^+$ and $\phi$ denote an indolenine ring residue and a benzoindolenine ring residue or a dibenzo indolenine ring residue respectively. L denotes a connecting group composing a monocarbo or dicarbo cyanine dye. $X^-$ denotes an anion, and m denotes an integer of 0 or 1.)

(Protective Layer)

In an embodiment of the present invention, the protective layer 15 is formed between the optical recording layer 14 and the optical transparency layer 17, which will be described later, for the purpose of adjusting the recording characteristic, improving adhesive property or protecting the optical recording layer 14. The protective layer 15 is coated over the optical recording layer 14 as a transparent film, which is made of $SiO_2$, $ZnS$—$SiO_2$, $Nb_2O_5$—$Al_2O_3$ or the like, according to the sputtering method.

In an embodiment of the present invention, when an attempt is made to form the protective layer 15, the aforesaid optical reflective layer 13 formed with a metallic film or an alloy film is already formed. Therefore, at least one of the inner mask 3 and outer mask 4 to be used for sputtering has to act as a mask that does not come into contact with the already coated optical reflective layer 13.

A description will be made by presenting concrete examples of the masks.

The first example refers to the outer mask 4 and inner mask 3 to be used to form the protective layer 15. Masking areas to be preserved by the outer mask 4 and inner mask 3 to be used to form the protective layer 15 are larger than masking areas to be preserved by the outer mask 4 and inner mask 3 to be used to form the optical reflective layer 13.

In other words, the outer mask 4 to be used to form the protective layer 15 has the inner circumferential end thereof located circumferentially outside the position equivalent to the outer circumferential end of the area of the already coated reflective layer. The inner mask to be used to form the protective layer 15 has the outer circumferential end thereof located circumferentially inside the position equivalent to the inner circumferential end of the area of the already coated reflective layer.

Figure 3:
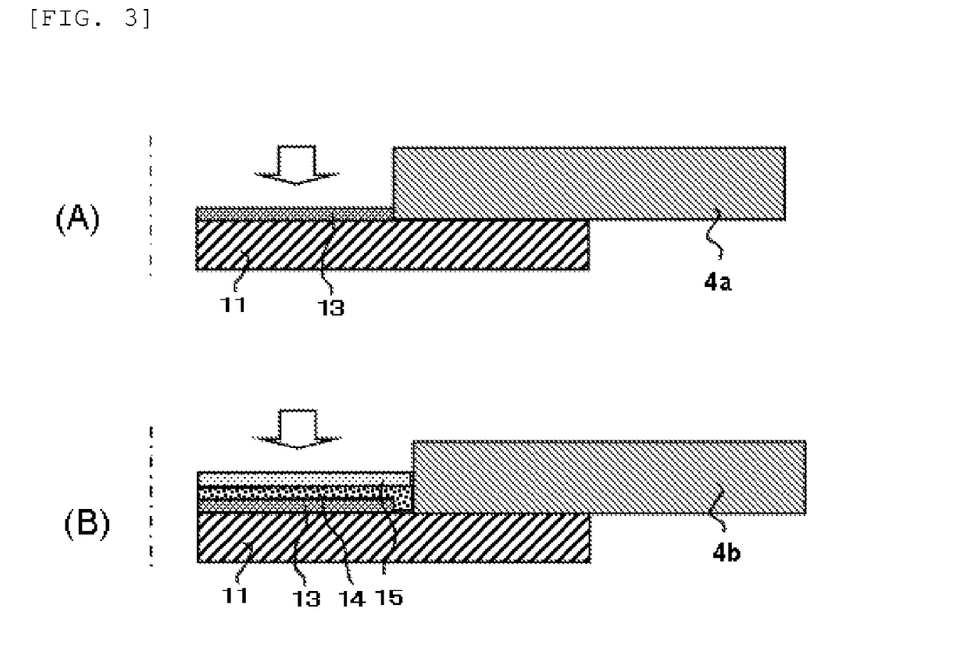
FIG. 3 illustratively shows one form of an outer mask employed in an embodiment of the present invention.

For example, assuming that the optical reflective layer 13 is coated using the outer mask 4a (FIG. 3(A)) whose inner circumferential diameter is 118.0 mm and the inner mask 3 whose outer circumferential diameter is 34.0 mm, the inner circumferential diameter of the outer mask 4b (FIG. 3(B)) to be used to form the protective layer 15 has a difference of 1 mm from the inner circumferential diameter of the outer mask 4a to be used to form the optical reflective layer 13. The masking area to be preserved by the outer mask 4b to be used to form the protective layer 15 is determined as a range of 119.0 mm or more from the center. Thus, contact with the optical reflective layer can be effectively avoided. FIG. 3 shows the example of the outer mask 4a, 4b. Assuming that the inner circumferential diameter of the outer mask 4b is 118.5 mm, if the reflective layer is slightly displaced due to the eccentricity of the substrate or device or a film is accumulated in the mask, there is a possibility that the outer mask 4b may come into contact with the optical reflective layer 13.

The same applies to the inner mask 3 to be used to form the protective layer 15. The outer circumferential diameter of the inner mask 3 has a difference of 1 mm from the outer circumferential diameter of the inner mask 3 to be used to form the optical reflective layer 13, and is set to 33.0 mm. Thus, contact with the optical reflective layer 13 can be effectively avoided.

The second example refers to the outer mask 4 or inner mask 3 whose thickness is decreased at the inner circumferential end of the outer mask 4 or the outer circumferential end of the inner mask 3 as if the thickness of the circumferential end of the mask 4 or 3 on the substrate side thereof were slantways or stairs removed. Owing to the shape, the optical reflective layer 13 and the mask 4 or 3 will not come into contact with each other but the protective layer 15 can be formed. At the same time, abnormal electrical discharge will not take place.

Figure 4:
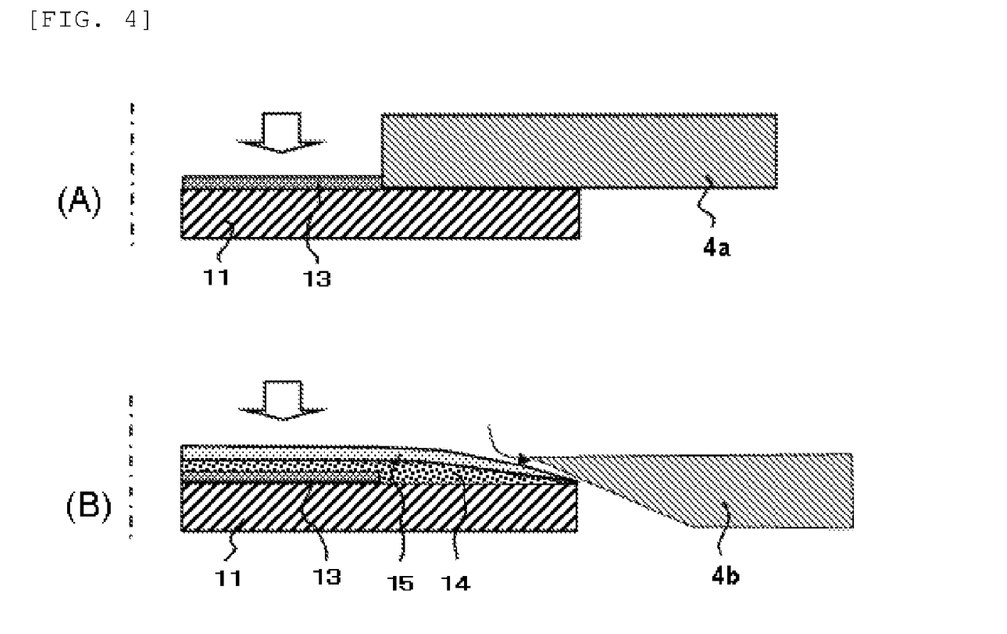
FIG. 4 illustratively shows another form of the outer mask employed in an embodiment of the present invention.

FIG. 4 shows the example of the outer mask 4a, 4b. As shown in the drawing, the inner circumferential diameter of the outer mask 4a (FIG. 4(A)) of the foregoing example is 118.0 mm. The inner circumferential end of the outer mask 4b (FIG. 4(B)) is located at the position equivalent to the outer circumferential end of the already coated optical reflective layer. The thickness of the inner circumferential end part of the mask 4b slantways increases toward the outer circumference thereof. In the space formed by the slant part, contact with the already coated optical reflective layer 13 is effectively avoided.

The same applies to the inner mask 3. The outer circumferential end part of the inner mask may be slanted or stepped toward the center part thereof. In either case, contact with the optical reflective layer 13 can be effectively avoided.

FIG. 4 shows the example referring to the mask 3 or 4 that is used to form the protective layer 15 and has the circumferential end part thereof on the substrate side thereof slanted. In an embodiment of the present invention, the thickness of the employed mask 3 or 4 on the substrate side thereof is preferably increased along with a departure from an area, in which the optical reflective layer is formed, for fear the mask 3 or 4 may come into contact with the already formed optical reflective layer 13.

(Adhesive Layer)

In an embodiment of the present invention, the adhesive layer 16 is an arbitrary layer to be formed in order to improve the adhesion between the protective layer 15 and the transparent layer 17 of a sheet shape that will be described later.

As the adhesive layer 16, a layer made of a material whose principal component is an epoxy resin or any other transparent reactive stiffening resin or an ultraviolet stiffening transparent resin is preferred. After the material is applied to the protective layer 15 and/or the lower surface of the sheet-shaped optical transparency layer 17 of approximately 0.1 mm thick, which will be described later, according to the spin coat method or screen-printing method, the protective layer 15 on the substrate 11 and the sheet-shaped optical transparency layer 17 are bonded to each other by the adhesive layer 16. This results in the disc-shaped optical information recording medium of approximately 1.2 mm thick.

(Optical Transparency Layer)

In an embodiment of the present invention, as the optical transparency layer 17, a layer made of a material composed of a transparent resin is preferred. More particularly, preferably, a sheet made of, for example, a polycarbonate resin, an acrylic resin, or any other resin exhibiting a high optical transparency is used as the optical transparency layer, or the resin is applied according to the spin coat method in order to form the optical transparency layer 17.

The optical transparency layer 17 is, as described in conjunction with FIG. 2A to FIG. 2C, formed to be wider than the area in which the protective layer 15 made of an inorganic material is formed. Therefore, the protective layer 15 made of the inorganic material can be prevented from peeling off on the interface with the substrate 11.

More preferably, the optical transparency layer 17 continuously extends to the outer circumferential margin of the optical information recording medium. Thus, degradation under the environment of high temperature and high humidity can be effectively prevented.

Preferably, the thickness of the optical transparency layer 17 is normally 0.1 mm so that data will be recorded in and/or read from the optical recording layer 14 by irradiating laser light of a wavelength ranging normally approximately, from 400 nm to 420 nm.

In the present disclosure where conditions and/or structures are not specified, the skilled artisan in the art can readily provide such conditions and/or structures, in view of the present disclosure, as a matter of routine experimentation. Also, in the present disclosure, the numerical numbers applied in specific embodiments can be modified by a range of at least ±50% in other embodiments, and the ranges applied in embodiments may include or exclude the endpoints.

EXAMPLE

Embodiments of the present invention will be described more concretely on the assumption that the manufacturing method of the embodiment shown in FIG. 2C is employed. The disclosed embodiments and the drawing are not intended to limit the present invention.

(Manufacturing a Substrate)

A photoresist (photosensitizer) was applied to a glass base by a predetermined thickness according to the spin coat method in order to form a resist film. After the glass base was exposed to laser light emanating from a cutting device so that the glass base would have a predetermined exposure width size, a developer was dropped to the resultant glass base in order to perform development processing. Thus, an ruggedness resist pattern corresponding to the groove 12 in the substrate 11 of the disc-shaped optical information recording medium was formed.

Thereafter, nickel was precipitated on the glass base by performing plating processing, and peeled off. The outline of the glass base was trimmed in the form of a disc in order to produce a stamper.

Thereafter, the stamper was set in place in the cavity of an injection molding device. A polycarbonate resin was poured into the cavity. This resulted in the substrate 11 having a diameter of 120 mm and having the spiral-shaped groove 12 formed on the main surface thereof.

(Forming the Optical Reflective Layer)

In a sputtering device, the outer mask 4 whose inner circumferential diameter was 118.0 mm and the inner mask 3 whose outer circumferential diameter was 34.0 mm were used, and an Ag alloy having a composition of 0.65 weight percent of Ag, 1.0 weight percent of Cu, and In was adopted as a target material. An argon gas was recomposed into plasma under a gas pressure of about $10^{-2}$ torr, and Ar+ ions were allowed to collide against a target in order to perform sputtering on the main surface of the substrate 11 in which the spiral-shaped groove 12 was formed. Thus, the optical reflective layer 13 having a uniform thickness of 100 nm was formed in an area extending from a radius of 17 mm from the center of the disc to a radius of 59 mm therefrom.

(Forming the Optical Recording Layer)

On the upper surface of the substrate 11 having the reflective layer 13 coated over it, the optical recording layer 14 of 60 nm thick was formed in an area extending from a radius of 18 mm from the center of the disc to a radius of 60 mm therefrom. Specifically, the azo dye expressed by the chemical formula 1 or the cyanine dye expressed by the chemical formula 2 was dissolved together with a binder into a solvent, for example, tetrafluoro propanol (TFP), whereby an coating liquid was prepared. Thereafter, the coating liquid was rotatively applied to the optical reflective layer according to the spin coat method in order to form a film. Thereafter, the film was desiccated at the temperature of 80° C. for thirty min.

(Forming the Protective Layer)

Thereafter, in the sputtering device, the outer mask 4 having an internal circumferential diameter of 119.0 mm and the inner mask 3 having a diameter of 33.0 mm were used to recompose an argon gas into plasma under a gas pressure of about $10^{-2}$ torr. Ar$^+$ ions were allowed to collide against $ZnS$—$SiO_2$ in order to perform sputtering on the substrate on which the optical recording layer 14 was formed. Due to the sputtering, the protective layer 15 of 25 nm thick was formed in an area extending from a radius of 16.5 mm from the center of the disc to a radius of 60 mm therefrom. Abnormal electrical discharge did not take place during coating of the protective layer 15. As the outer mask 4 used to form the protective layer 15, the outer mask 4 having the slant part on the inner circumferential side thereof as shown in FIG. 4 was adopted.

(Forming the Optical Transparency Layer)

Further, on the substrate on which the protective layer 15 was formed, the spin coat method was used to apply an acrylic resin to an area which overpasses the area extending from a radius of 9 mm from the center of the disc to a radius of 60 mm therefrom, covers the outer circumference and inner circumference of the protective layer 15, and reaches the flank of the substrate 11 on the outer circumferential side thereof. Thereafter, ultraviolet rays were irradiated in order to cure the acrylic resin, whereby the optical transparency layer 17 of 0.1 mm thick was formed. The process was then terminated and the disc-shaped optical information recording medium 10 of approximately 1.2 mm thick was produced.

The produced optical information recording medium 10 had no defect in the appearance thereof, exhibited a designed electrical characteristic, and had no abnormality.

Comparative Example

The optical information recording medium 10 was produced in the same manner as that of the example 1 except that the protective layer 15 was formed using the outer mask 4 having an inner circumferential diameter of 118.0 mm and the inner mask 3 having a diameter of 34.0 mm. Occurrence of abnormal electrical discharge was observed during coating of the protective layer 15. As for the produced optical information recording medium, the outermost circumferential part of the optical reflective layer was jagged along the periphery thereof. A defect was observed in the appearance of the optical information recording medium. Jitter worsened and record sensitivity deteriorated.

The present application claims priority to Japanese Patent Application No. 2007-320584, filed Dec. 12, 2007, and No. 2008-285956, filed Nov. 6, 2008, the disclosure of each of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. An optical information recording medium comprising at least an optical reflective layer, an optical recording layer, a protective layer, and an optical transparency layer, which are layered in this order on a main surface of a substrate, wherein:
   the protective layer is a sputtered layer constituted by an inorganic material, and an area in which the protective layer is formed is wider than an area in which the optical reflective layer is formed, and outwardly extends to overpass and cover an outer circumferential end of the optical reflective layer, as viewed above the substrate, and
   the optical transparency layer continuously extends to overpass the outer circumferential end of the substrate as viewed above the substrate, and covers and touches a margin of the outer circumferential end of the substrate.

2. The optical information recording medium according to claim 1, wherein the optical transparency layer covers the protective layer and continuously extends to an outer circumferential end of the substrate as viewed above the substrate.

3. The optical information recording medium according to claim 1, wherein the protective layer is a layer of $SiO_2$, $AnS$—$SiO_2$, or $Nb_2O_5$—$Al_2O_3$ formed by a sputtering method.

4. The optical information recording medium according to claim 1, wherein the substrate is a disc-shaped substrate having a spiral-shaped groove formed in the main surface.

5. The optical information recording medium according to claim 1, which is a Blu-ray disc.

6. A manufacturing method of the optical information recording medium according to claim 1, comprising: (i) after forming the optical reflective layer on the substrate, placing an outer mask for forming the protective layer by positioning an inner circumferential end of the outer mask circumferentially outside a position corresponding to an outer circumferential end of the optical reflective layer as viewed above the substrate so as to avoid contact between the outer mask and the optical reflective layer; (ii) forming the protective layer by a sputtering method using the outer mask so that the optical reflective layer outwardly extends to overpass and cover an outer circumferential end of the optical reflective layer, as viewed above the substrate; and (iii) forming the optical transparency layer so that the optical transparency layer continuously extends to overpass the outer circumferential end of the substrate as viewed above the substrate, and covers and touches a margin of the outer circumferential end of the substrate.

7. The manufacturing method according to claim 6, further comprising, prior to step (ii), placing an inner mask for forming the protective layer by positioning an outer circumferential end of the inner mask closer to a center than a position corresponding to an inner circumferential end of the optical reflective layer as viewed from above the substrate.

8. The optical information recording medium according to claim 1, wherein the area in which the protective layer is formed extends inwardly to overpass and cover an inner circumferential end of the optical reflective layer, as viewed above the substrate.

9. The optical information recording medium according to claim 1, wherein an area in which the optical recording layer is formed is wider than an area in which the optical reflective layer is formed, and outwardly extends to overpass and cover an outer circumferential end of the optical reflective layer, as viewed above the substrate.

10. An optical information recording medium comprising at least an optical reflective layer, an optical recording layer, a protective layer, and an optical transparency layer, which are layered in this order on a main surface of a substrate, wherein:
    the protective layer is a sputtered layer constituted by an inorganic material, and an area in which the protective layer is formed is wider than an area in which the optical reflective layer is formed, and outwardly extends to overpass and cover an outer circumferential end of the optical reflective layer, as viewed above the substrate, wherein the thickness of the protective layer is tapered between the outer circumferential end of the optical reflective layer and the end of the outer circumferential end of the substrate toward the outer circumferential end of the substrate.

11. The optical information recording medium according to claim 10, wherein the optical transparency layer continuously extends to overpass the outer circumferential end of the substrate as viewed above the substrate, and covers and touches a margin of the outer circumferential end.

12. A manufacturing method of the optical information recording medium according to claim 10, comprising: (i)

after forming the optical reflective layer on the substrate, placing an outer mask for forming the protective layer by positioning an inner circumferential end of the outer mask circumferentially outside a position corresponding to an outer circumferential end of the optical reflective layer as viewed from above the substrate so as to avoid contact between the outer mask and the optical reflective layer, wherein a thickness of the outer mask near the inner circumferential end thereof continuously or stepwise increases in an outward direction; and (ii) forming the protective layer by a sputtering method using the outer mask so that the thickness of the protective layer is tapered between the outer circumferential end of the optical reflective layer and the end of the outer circumferential end of the substrate toward the outer circumferential end of the substrate.

13. The manufacturing method according to claim 12, further comprising, prior to step (ii), placing an inner mask for forming the protective layer by positioning an outer circumferential end of the inner mask closer to a center than a position corresponding to an inner circumferential end of the optical reflective layer as viewed from above the substrate, wherein a thickness of the inner mask near the outer circumferential end thereof continuously or stepwise increases in an inward direction.

14. The optical information recording medium according to claim 10, wherein the optical transparency layer continuously extends to overpass the outer circumferential end of the substrate as viewed above the substrate, and covers and touches a margin of the outer circumferential end of the substrate.

15. The optical information recording medium according to claim 10, wherein an area in which the optical recording layer is formed is wider than an area in which the optical reflective layer is formed, and outwardly extends to overpass and cover an outer circumferential end of the optical reflective layer, as viewed above the substrate, wherein the thickness of the optical recoding layer is tapered between the outer circumferential end of the optical reflective layer and the end of the outer circumferential end of the substrate toward the outer circumferential end of the substrate.

16. An optical information recording medium comprising at least an optical reflective layer, an optical recording layer, a protective layer, and an optical transparency layer, which are layered in this order on a main surface of a substrate, wherein:
   an area in which the optical recording layer is formed is wider than an area in which the optical reflective layer is formed, and outwardly extends to overpass and cover an outer circumferential end of the optical reflective layer, as viewed above the substrate, and
   the protective layer is a sputtered layer constituted by an inorganic material, and an area in which the protective layer is formed is wider than an area in which the optical reflective layer is formed, and outwardly extends to overpass and cover an outer circumferential end of the optical reflective layer, as viewed above the substrate.

17. The optical information recording medium according to claim 16, wherein the optical transparency layer continuously extends to overpass the outer circumferential end of the substrate as viewed above the substrate, and covers and touches a margin of the outer circumferential end of the substrate.

* * * * *